US008255093B2

(12) United States Patent
Layton et al.

(10) Patent No.: US 8,255,093 B2
(45) Date of Patent: Aug. 28, 2012

(54) KIT TO ADAPT AN AUTOMOTIVE VEHICLE FOR REMOTE OPERATION, AUTOMOTIVE REMOTE CONTROL CONVERSION PEDESTAL, AND SYSTEM

(75) Inventors: Jacob Kyle Layton, Green Valley, AZ (US); Morgan J. Bakarich, Tucson, AZ (US); Donald J. Lacey, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1011 days.

(21) Appl. No.: 12/201,472

(22) Filed: Aug. 29, 2008

(65) Prior Publication Data

US 2010/0057274 A1 Mar. 4, 2010

(51) Int. Cl.
*G05D 1/00* (2006.01)

(52) U.S. Cl. .......................................................... 701/2

(58) Field of Classification Search ............... 701/2, 36, 701/41, 51, 53, 70, 95; 180/316, 320, 333, 180/443, 444
See application file for complete search history.

(56) References Cited

U.S. PATENT DOCUMENTS

| | | | | |
|---|---|---|---|---|
| 4,170,953 A * | 10/1979 | Pounder et al. | ........... | 114/144 E |
| 4,280,604 A * | 7/1981 | Lambicco | ....................... | 477/123 |
| 4,476,954 A * | 10/1984 | Johnson et al. | ............... | 180/333 |
| 5,172,589 A * | 12/1992 | Witt | ................................. | 73/132 |
| 5,263,396 A * | 11/1993 | Ladan et al. | .................... | 89/1.11 |
| 5,270,628 A * | 12/1993 | Noguchi et al. | ............... | 318/587 |
| 5,363,027 A * | 11/1994 | Noguchi | ......................... | 318/573 |
| 5,372,035 A * | 12/1994 | Ogawa et al. | ............... | 73/118.01 |
| 5,394,743 A * | 3/1995 | Noguchi et al. | ........... | 73/118.01 |
| 5,415,034 A * | 5/1995 | Nishikawa et al. | ......... | 73/118.01 |
| 5,865,266 A * | 2/1999 | Froelich et al. | ................ | 180/443 |
| 6,259,980 B1 * | 7/2001 | Peck et al. | ....................... | 701/24 |
| 7,458,439 B2 * | 12/2008 | Catton et al. | ................... | 180/334 |
| 7,628,239 B1 * | 12/2009 | Louie et al. | ..................... | 180/167 |
| 7,712,571 B2 * | 5/2010 | Proud et al. | .................... | 180/331 |

FOREIGN PATENT DOCUMENTS

WO WO-2010024899 A1 3/2010

OTHER PUBLICATIONS

"International Application Serial No. PCT/US2009/04870, Search Report mailed Nov. 2, 2009", 3 pgs.
"International Application Serial No. PCT/US2009/04870, Written Opinion mailed Nov. 2, 2009", 11 pgs.

* cited by examiner

*Primary Examiner* — Mary Cheung
*Assistant Examiner* — Truc M Do
(74) *Attorney, Agent, or Firm* — Schwegman, Lundberg & Woessner, P.A.; Gregory J. Gorrie (57) ABSTRACT

Embodiments of a kit, automotive control pedestal and system to adapt an automotive vehicle for remote operation are disclosed. The pedestal mounts in place of a driver's seat of the vehicle to allow both human and remote operation of the vehicle. The kit includes the pedestal with a steering servo, a hydraulic brake servo, a throttle control servo, and a gear-selection linear actuator mounted thereon. The kit may also include a control system and a video transmission system for remote operation.

20 Claims, 5 Drawing Sheets

FIG. 1  SYSTEM FOR REMOTE OPERATION OF A VEHICLE

FIG. 4B ically-extendable stand 204. Linear actuator 108 may be mounted to an opposite
KIT TO ADAPT AN AUTOMOTIVE VEHICLE FOR REMOTE OPERATION, AUTOMOTIVE REMOTE CONTROL CONVERSION PEDESTAL, AND SYSTEM

LICENSE RIGHTS

This invention was made with Government support under F42650-01-C-7218. The Government has certain rights in this invention.

TECHNICAL FIELD

Some embodiments pertain to remote vehicle operation and systems for remote vehicular operations.

BACKGROUND

Controlling an automobile remotely conventionally required a custom-made electromechanical system. These systems are expensive and time-consuming to install. Vehicles that are equipped with such systems are generally no longer drivable by a person. Furthermore, if the vehicle equipped with such a system is damaged, it is difficult and time-consuming to re-install the system in another vehicle.

Thus there are general needs for systems for remote vehicle operation that install quickly and easily, are suitable for many types of vehicles, allow a person to operate the vehicle with the system installed, and are easier and less time-consuming to re-install in another vehicle. There are also general needs for systems for remote vehicle operation that are universal and adaptable to many vehicle configurations. There are also general needs for systems for remote vehicle operation that are able to withstand harsh environments, are cost effective and easy to manufacture.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Figure 1:
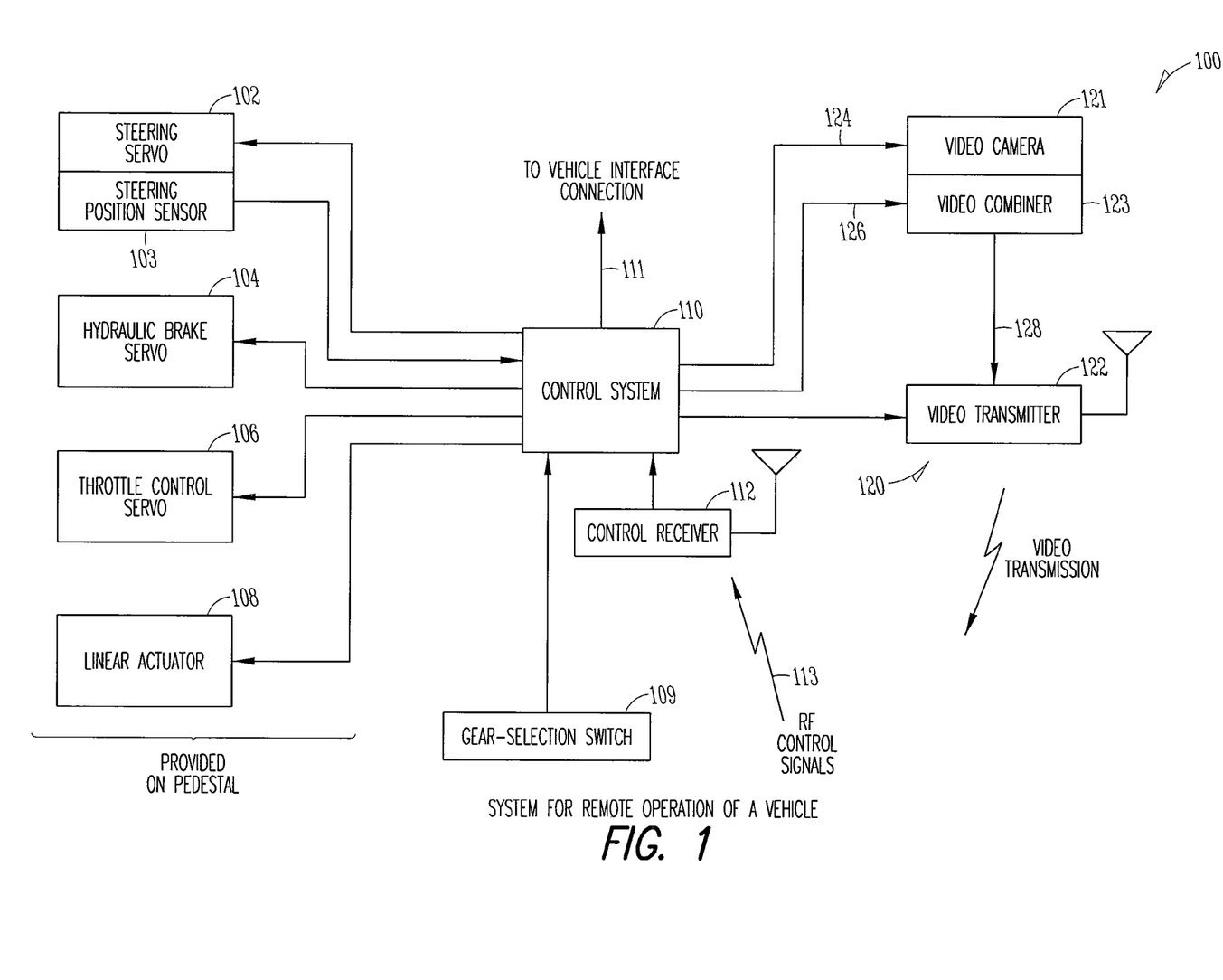
FIG. 1 is a block diagram of a system for remote operation of a vehicle in accordance with some embodiments.

FIG. 1 is a block diagram of a system for remote operation of a vehicle in accordance with some embodiments. System 100 includes steering servo 102 for coupling with the steering wheel of a vehicle, hydraulic brake servo 104 for coupling with the braking system of the vehicle, throttle control servo 106 for coupling with the throttle of the vehicle, and linear actuator 108 for coupling with a gear-selection mechanism of the vehicle. System 100 may also include control system 110 and control receiver 112 for controlling steering servo 102, hydraulic brake servo 104, throttle control servo 106, and linear actuator 108 based on multi-channel RF control signals 113. System 100 may also include video transmission system 120 which may include video camera 121, video combiner 123 and video transmitter 122. System 100 may also include steering position sensor 103 and gear-selection switch 109.

In accordance with embodiments, control system 110 and control receiver 112 may be configured to control steering servo 102, steering position sensor 103, hydraulic brake servo 104, throttle control servo 106, and linear actuator 108. Control steering servo 102, steering position sensor 103, hydraulic brake servo 104, throttle control servo 106, and linear actuator 108 may be provided on a pedestal that may mount in place of a driver's seat of the vehicle to allow both human and remote operation of the vehicle. These embodiments are described in more detail below.

System 100 may be configured to install in many type of vehicles, including civilian automobiles, such as trucks, SUVs and cars, and military vehicles such as Hummvees, military transport vehicles and tanks. System 100 may be provided in a kit, as further described below. Some embodiments of system 100 may be configured for use in boat with the exclusion of hydraulic brake servo 104. Vehicles that include system 100 may be used as high-speed moving targets for weapons testing and aerial reconnaissance, although the scope of the embodiments is not limited in this respect. Vehicles that include system 100 may also be used for commercial applications such as barrier testing, police department high-speed chase testing, and any moving vehicle application where human danger is present or unavoidable. Vehicles that include system 100 may also be used for demolition derbies, full-size radio-controlled (RC) racing, parade floats and RC targets.

Figure 2A:
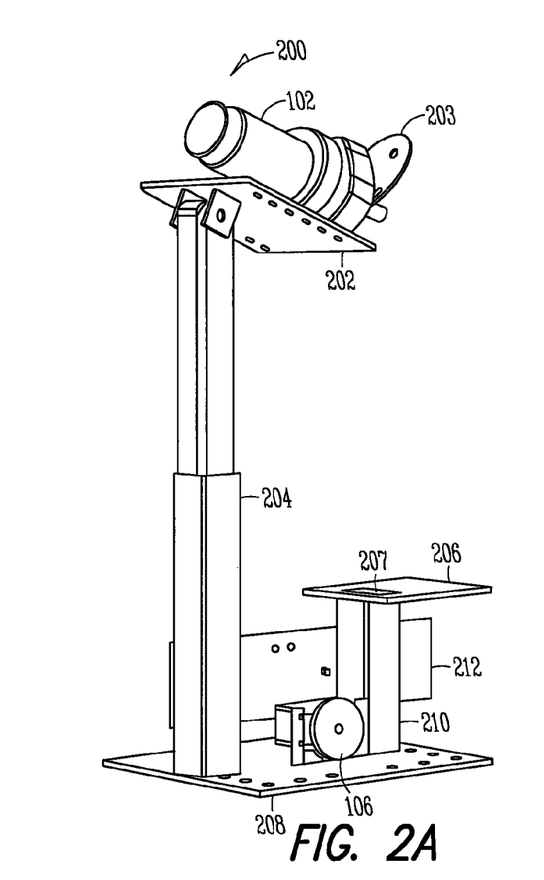
FIG. 2A illustrates a side view of a remote-control conversion pedestal in accordance with some embodiments.
Figure 2B:
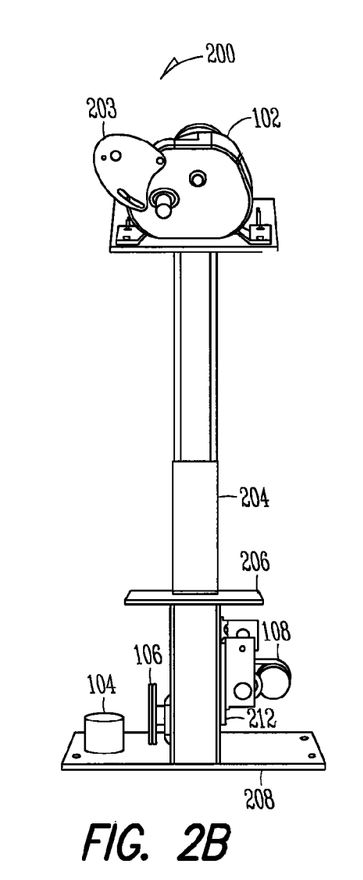
FIG. 2B illustrates a front view of the remote-control conversion pedestal of FIG. 2A in accordance with some embodiments.
Figure 2C:
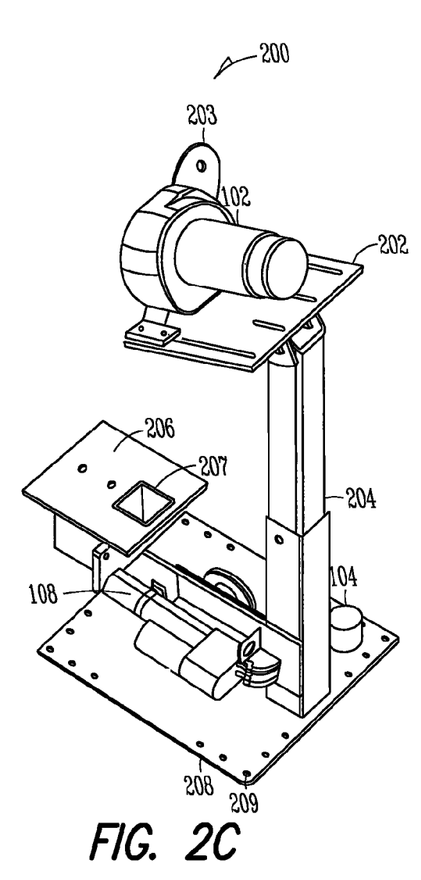
FIG. 2C illustrates a perspective view of the remote-control conversion pedestal of FIG. 2A in accordance with some embodiments.

FIG. 2A illustrates a side view of a remote-control conversion pedestal in accordance with some embodiments. FIG. 2B illustrates a front view of the remote-control conversion pedestal of FIG. 2A in accordance with some embodiments. FIG. 2C illustrates a perspective view of the remote-control conversion pedestal of FIG. 2A in accordance with some embodiments.

Remote-control conversion pedestal 200 may be provided as part of a kit to adapt a vehicle for remote operation. Remote-control conversion pedestal 200 may include tiltable plate 202, vertically-extendable stand 204, platform 206, bottom plate 208, vertical stand 210 and side plate 212. Steering servo 102 may mount on tiltable plate 202, which may be mounted on vertically-extendable stand 204. Bottom plate 208 may be coupled to vertically-extendable stand 204 and may be adapted to bolt to the floor of the vehicle in place of the driver's seat. Platform 206 may be configured to support a seat for a human during human operation and may be coupled to vertical stand 210. Vertical stand 210 may be coupled to bottom plate 208. Throttle control servo 106 may be mounted to a vertical surface of side plate 212. Side plate 212 may couple vertical stand 210 with vertically-extendable stand 204. Linear actuator 108 may be mounted to an opposite vertical surface of side plate 212 for coupling with the gear selection mechanism of the vehicle. Hydraulic brake servo 104 may mount on bottom plate 208 for coupling with the braking system of the vehicle.

In some embodiments, throttle control servo 106 may be configured to couple with a throttle body of the vehicle using a throttle cable. Linear actuator 108 may couple with a gear selection mechanism of an automatic transmission of the vehicle using a flexible push-pull rod or cable to perform gear selection. In some embodiments, hydraulic brake servo 104 may be an electrically operated hydraulic brake servo and may be configured to couple with hydraulic brake lines of the vehicle.

Steering servo 102 may be configured to couple with the steering wheel of the vehicle. Tiltable plate 202 and vertically-extendable stand 204 may allow a height and angle of steering servo 102 to be changed with respect to the steering wheel.

Steering position sensor 103 may mount on bracket 203 adjacent to steering servo 102. Steering position sensor 103 may couple to an output shaft of steering servo 102 to sense the rotational position of steering servo 102. In some embodiments, steering position sensor 103 may be a potentiometer coupled to the output shaft of steering servo 102 by a chain, belt or toothed belt and may, for example, be able to sense the position of the steering wheel. In some embodiments, the position of the steering wheel may be determined for up to four or more rotations in either direction, although the scope of the embodiments is not limited in this respect. In some embodiments, a pulse-width modulated control signal may be used to proportionally control steering servo 102 through the use of position sensing provided by steering position sensor 103.

In some embodiments, platform 206 includes seat socket 207 to accept a seat to support a human for human operation of the vehicle while pedestal 200 remains mounted to the vehicle floor. In some embodiments, seat socket 207 may be configured to accept a tractor seat, although the scope of the embodiments are not limited in this respect as other types of seats may also be suitable. In some embodiments, bottom plate 208 may include pre-drilled holes 209 positioned to align with the bolt holes of the driver's seat when the driver's seat is removed.

Figure 3:
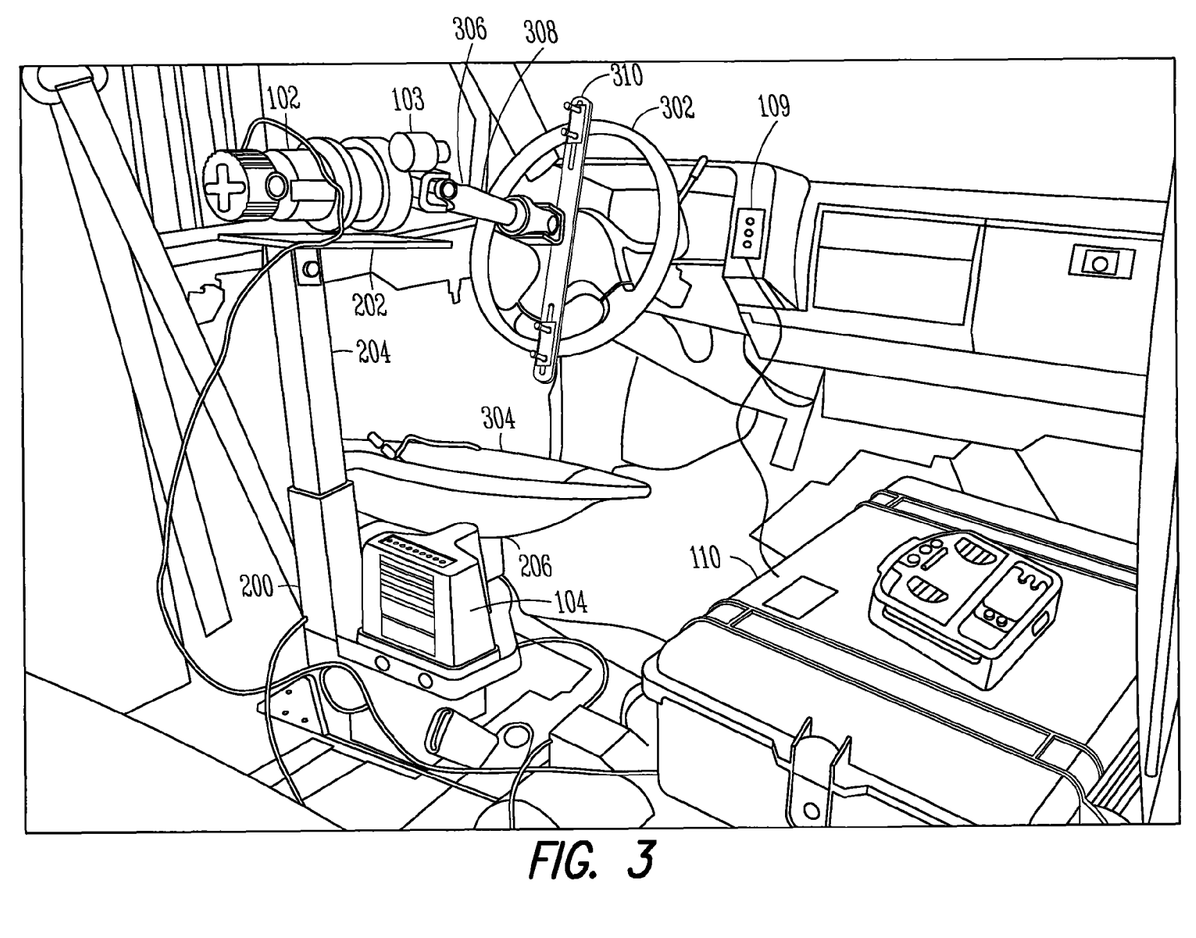
FIG. 3 illustrates a system for remote operation installed in a vehicle in accordance with some embodiments.

FIG. 3 illustrates a system for remote operation installed in a vehicle in accordance with some embodiments. As illustrated in FIG. 3, pedestal 200 is bolted in place of the driver's seat in the vehicle. As shown in FIG. 3, steering servo 102 is coupled to steering wheel 302 with adjustable steering drive head 308 comprising extendable shaft 306 with one or more universal joints. Adjustable steering drive head 308 may couple to steering wheel 302 with steering wheel cross-bar 310 that may clamp on or across steering wheel 302 to allow rotation of steering wheel 302 by steering servo 102. Tiltable plate 202 and the u-joints of extendable shaft 306 allow adjustable steering drive head 308 and steering servo 102 to be placed in a stowed position to allow human operation of the vehicle while pedestal 200 remains mounted to the vehicle floor. Seat 304 as mounted on platform 206 may be used to support a human during human operation of the vehicle when adjustable steering drive head 308 and steering servo 102 are in the stowed position.

Figure 4A:
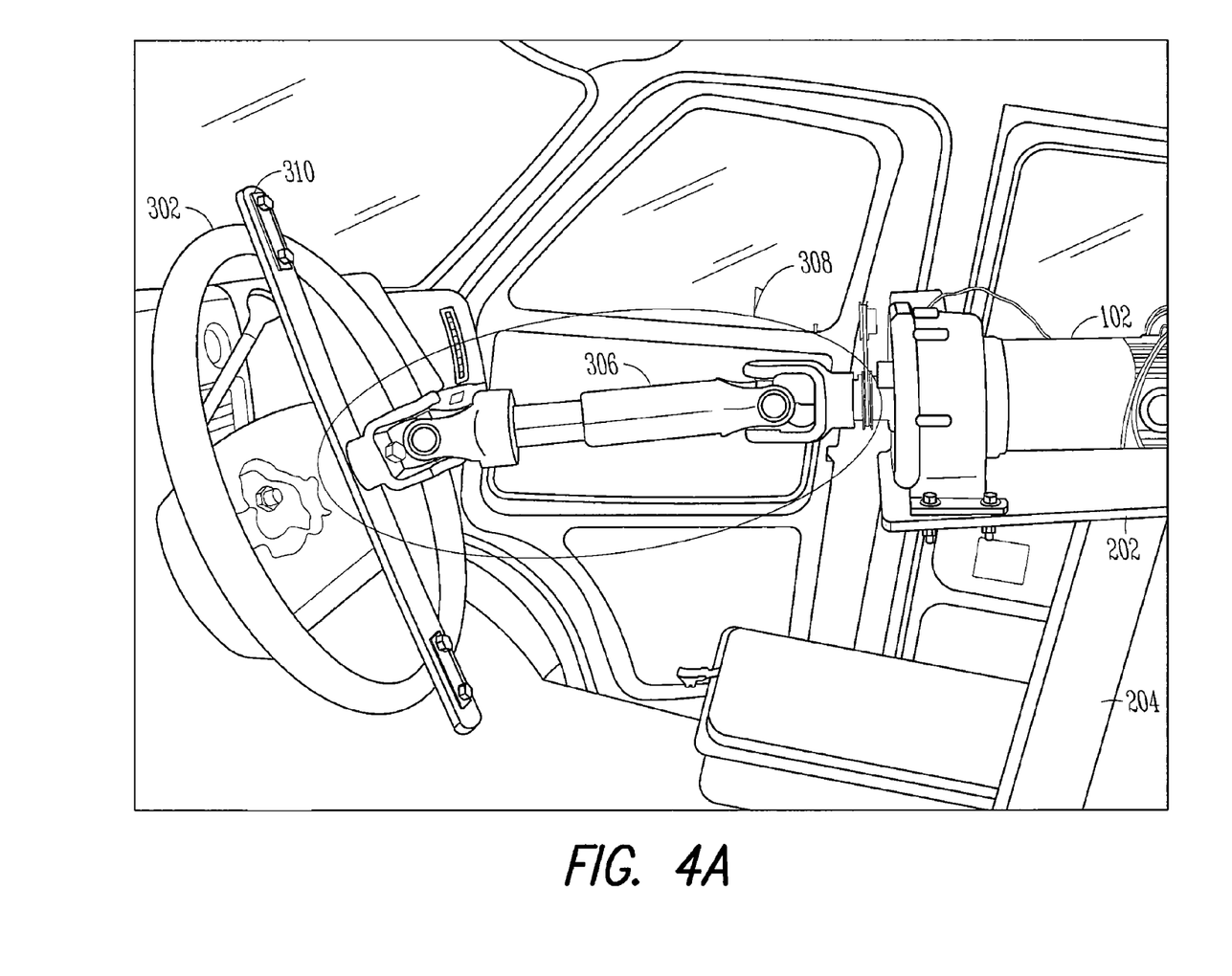
FIG. 4A illustrates an adjustable steering drive head and steering servo in an operational position in accordance with some embodiments.

FIG. 4A illustrates adjustable steering drive head 308 and steering servo 102 in an operational position in accordance with some embodiments. Adjustable steering drive head 308 couples steering servo 102 to steering wheel 302 with steering wheel cross-bar 310. In this operational position, the vehicle may be remotely controlled.

Figure 4B:
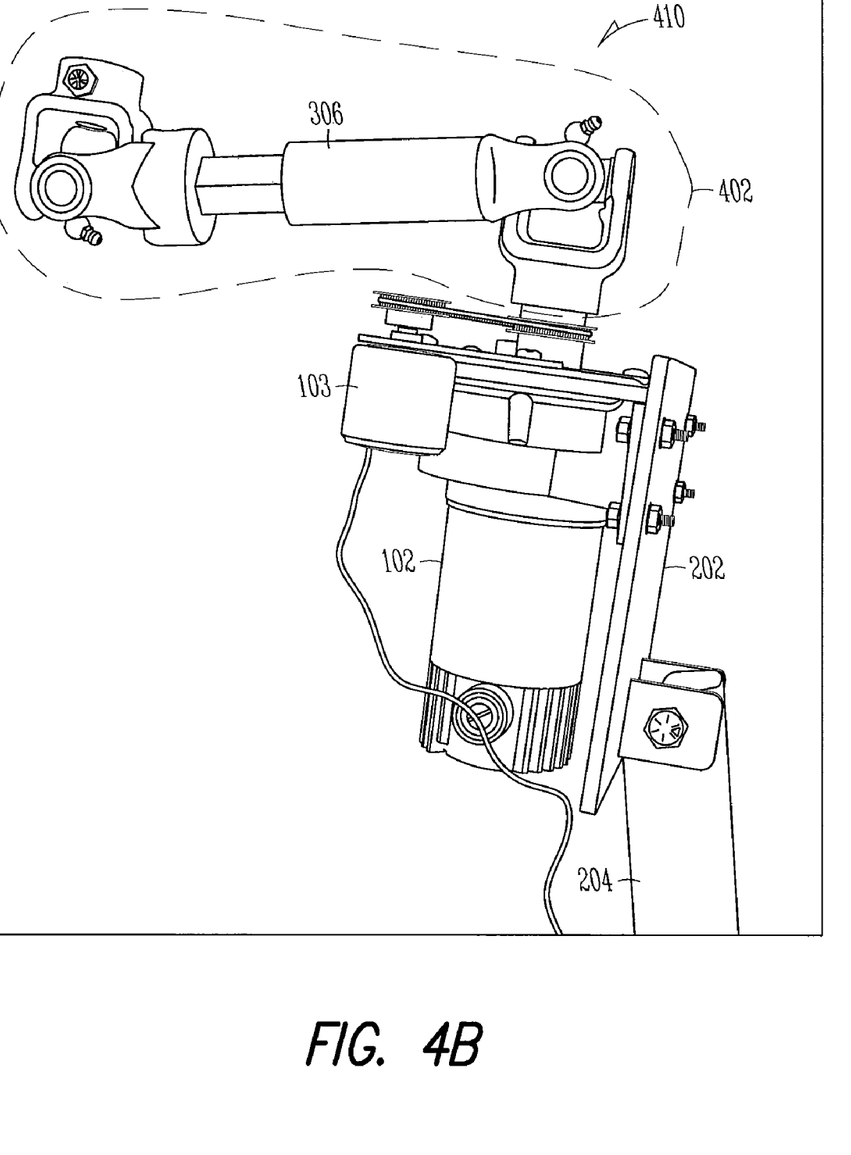
FIG. 4B illustrates the adjustable steering drive head and steering servo of FIG. 4A in a stowed position in accordance with some embodiments.

FIG. 4B illustrates the adjustable steering drive head and steering servo of FIG. 4A in a stowed position in accordance with some embodiments. In stowed position 410, tiltable plate 202 and the u-joints of extendable shaft 306 allow adjustable steering drive head 308 and steering servo 102 to be folded back out of the way to allow a human to sit on seat 304 (FIG. 3) for human operation of the vehicle. The front of the vehicle is toward the right in FIG. 4B and the driver's back may be positioned against vertically-extendable stand 204 during human operation.

Referring to FIGS. 1 through 3, gear-selection switch 109 may be an electric switch to allow human gear selection. Gear-selection switch 109 may be configured to mount to the dash of the vehicle and may be electrically coupled with linear actuator 108 through control system 110. In some embodiments, a shift-control module may be used to interface between gear-selection switch 109, linear actuator 108 and control system 110. The shift control module may be included within control system 110, although the scope of the embodiments is not limited in this respect. In some embodiments, gear-selection switch 109 may have push buttons to select gears during human operation of the vehicle. During remote operation of the vehicle, gear-selection linear actuator 108 is controlled remotely through control system 110. Gear selection may include park, reverse and drive, and in some embodiments, may include neutral, although the scope of the embodiments is not limited in this respect.

In some embodiments, the flexible push-pull rod or cable that is used to couple linear actuator 108 with the gear selection mechanism of the automatic transmission may be a push-pull cable and may be coupled to the bell-crank of the automatic transmission, although the scope of the embodiments is not limited in this respect. In some embodiments, linear actuator 108 may be calibrated to move the flexible push-pull rod or cable to select to a linear position corresponding to a particular transmission gear (e.g., park, reverse or drive).

In some embodiments, an additional brake line may be used to couple hydraulic brake servo 104 with the hydraulic brake lines of the vehicle. The additional brake line may run from bottom plate 208 along the floor-boards of the vehicle to up near the master cylinder or ABS block to allow the additional brake line to be coupled into one or more brake lines of the vehicle. In some embodiments, hydraulic brake servo 104 may be coupled to the front brake lines of the vehicle, although the scope of the embodiments is not limited in this respect. In some alternate embodiments, hydraulic brake servo 104 may be coupled to both the front and rear brake lines of the vehicle. In some embodiments, hydraulic brake servo 104 may include a hydraulic pump and a bypass valve to allow hydraulic pressure to be proportionally controlled, such as in electric trailer-braking systems. During remote operation of the vehicle, hydraulic brake servo 104 is proportionally controlled remotely through control system 110. During human operation of the vehicle, braking is controlled conventionally by use of the brake pedal.

In some embodiments, an additional or separate throttle cable may be used to couple throttle control servo 106 to a throttle control mechanism, such as the throttle body, of the vehicle. In some embodiments, the additional or separate throttle cable may be coupled to a cruise-control cam on the throttle body, although the scope of the embodiments is not limited in this respect. During remote operation of the vehicle, throttle control servo 106 may be proportionally controlled remotely through control system 110. During human operation of the vehicle, the throttle is controlled conventionally by the accelerator pedal.

In some embodiments, control system 110 may provide control signals to proportionally control steering servo 102, hydraulic brake servo 104, and throttle control servo 106. Control system 110 may also provide a gear-selection control signal to linear actuator 108. Control receiver 112 may receive multi-channel RF control signals 113 from a remote multi-channel transmitter and provide each channel of the control signals 113 to control system 110. Separate channels may be used to control the steering, braking, throttle and shifting. During human operation of the vehicle, the operation of control system 110 and control receiver 112 may be disabled.

In some embodiments, video transmission system 120 may transmit a live video of the frontal field-of-view of the vehicle and a dash view of the vehicle. The dash view may include at least a view of the vehicle's instruments to allow an operator to monitor the vehicle gauges. In some embodiments, video camera 121 may generate at least two video channels. One of the channels may provide the frontal field-of-view and another of the channels may provide the dash view. Video combiner 123 may be configured to combine the frontal field-of-view channel and the dash view channel to provide single channel video output 128. Video transmitter 122 may transmit single channel video output 128 to a remote operator. In some embodiments, single channel video output generated by video combiner 123 may be picture-within-a-picture to allow the dash view to be seen within the frontal field-of-view, although the scope of the embodiments is not limited in this respect.

In some embodiments, control system 110 may be configured to provide activation signal 124 and/or a power supply signal to video transmission system 120 to activate video camera 121 and/or to supply power to video camera 121. Control system 110 may also be configured to provide video-combiner control signal 126 to video combiner 123. Video-combiner control signal 126 may be used to reset video combiner 123 as well as configure video combiner 123 to combine two output channels from video camera 121 and operate in a picture-in-a-picture mode. In these embodiments, video combiner 123 may be a picture-in-a-picture module. Additional control signals may be used to configure video camera 121 to operate a two-channel mode. In some embodiments, signals to generate activation signal 124 and video-combiner control signal 126 may be received on separate channels of multi-channel RF control signals 113, although the scope of the embodiments is not limited in this respect.

In some embodiments, control system 110 may provide signals to video combiner 123 for on-screen display of vehicle status information. In these embodiments, control system 110 may generate vehicle status signals that may include, for example, speed and gear selection. Video combiner 123 may be configured to use these vehicle status signals to configure an on-screen display as part of single channel video output 128.

In some embodiments, power for video camera 121, video transmitter 122 and control receiver 112 may be provided by control system 110. In some embodiments, control system 110 may provide an on/off signal to video transmitter 122.

In some embodiments, control system 110 may include interface 111 to couple with the vehicle's interface connection. Interface 111 may be used to turn-on the vehicle's ignition, start the vehicle and turn-off the vehicle remotely. In these embodiments, signals to control the vehicle through interface 111 may be received on one or more channels of multi-channel RF control signals 113.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A kit to adapt an automotive vehicle for remote operation, the kit comprising:
    a steering servo for coupling to a steering wheel of the vehicle, the steering servo mounted on a tiltable plate, the tiltable plate mounted on a vertically-extendable stand;
    a bottom plate coupled to the vertically-extendable stand, the bottom plate adapted to bolt to a floor of the vehicle in place of a driver's seat;
    a platform to support a seat, the platform being coupled to a vertical stand which is coupled to the bottom plate;
    a throttle control servo mounted to a vertical surface of a side plate configured to couple with a throttle body of the vehicle using a throttle cable, the side plate coupling the vertical stand with the vertically-extendable stand;
    a gear-selection linear actuator mounted to an opposite vertical surface of the side plate configurable to couple with a gear selection mechanism of an automatic transmission of the vehicle using a flexible push-pull cable to allow gear selection; and
    an electrically operated hydraulic brake servo to mount on the bottom plate and configured to couple with hydraulic brake lines of the vehicle.

2. The kit of claim 1, wherein the tiltable plate, the vertically-extendable stand, the platform, the bottom plate, the vertical stand and the side plate comprise a remote-control conversion pedestal to mount in place of the driver's seat of the vehicle,
    wherein the tiltable plate allows the steering servo to be decoupled from the steering wheel to allow human operation of the vehicle.

3. The kit of claim 2 wherein the platform includes a seat socket to accept a seat, the seat to support a human for human operation of the vehicle while the pedestal remains mounted to the floor.

4. The kit of claim 3 wherein the tiltable plate and the vertically-extendable stand are configured to allow a height and angle of the steering servo to be changed with respect to the steering wheel, and
    wherein the kit further includes an adjustable steering drive head comprising an extendable shaft with one or two universal joints, the adjustable steering drive head configured to couple with the steering servo and to couple with a steering wheel cross-bar that clamps on the steering wheel to allow rotation of the steering wheel by the steering servo.

5. The kit of claim 4 wherein the tiltable plate and the universal joints of the extendable shaft are configured to allow the adjustable steering drive head and the steering servo to be placed in a stowed position to allow human operation of the vehicle while the pedestal remains mounted to the floor.

6. The kit of claim 1 further comprising a steering position sensor to mount on a bracket adjacent to the steering servo, the steering position sensor configured to be coupled to an output shaft of the steering servo to sense a rotational position of the steering servo.

7. The kit of claim 1 further comprising an electric gear-selection switch to allow human gear selection during human operation of the vehicle, the switch configured to mount on a dash of the vehicle and configured to control the gear-selection linear actuator.

8. The kit of claim 1 further comprising;
a control system to provide control signals to proportionally control the steering servo, the hydraulic brake servo, and the throttle control servo, and provide a gear-selection control signal to the gear-selection linear actuator; and
a control receiver to receive multi-channel RF control signals from a remote multi-channel transmitter and provide each channel of the multi-channel RF control signals to the control system.

9. The kit of claim 8 further comprising a video transmission system to transmit a live video of frontal field-of-view of the vehicle and a dash view of the vehicle, the dash view to include at least a view of the vehicle's speedometer.

10. The kit of claim 9 wherein the video transmission system comprises:
a video camera having at least two channels, one of the channels to provide the frontal field-of-view, another of the channels to provide the dash view;
a video combiner to combine the frontal field-of-view channel and the dash view channel to provide a single channel video output; and
a video transmitter to transmit the single channel video output to a remote operator,
wherein single channel video output comprises a picture-within-a-picture to allow the dash view to be seen within the frontal field-of-view.

11. The kit of claim 10 wherein the control system is configured to:
provide an activation signal to activate the video camera and to select two channel video operation, and
provide a video-combiner control signal to cause the video combiner to generate the single channel video output,
wherein the activation signal and the video-combiner control signal are received on separate channels of the multi-channel RF control signals.

12. The kit of claim 1 wherein during human operation of the vehicle:
the steering servo is decoupled from the steering wheel,
the seat is mounted to the platform to support a human while the bottom plate remains mounted to the vehicle floor,
the throttle control servo remains coupled with the throttle body of the vehicle and throttle control is provided by an accelerator of the vehicle,
the gear-selection linear actuator remains coupled with a gear selection mechanism of the transmission and gear selection is provided by an electric gear-selection switch coupled to the gear-selection linear actuator, and
the hydraulic brake servo remains coupled with the hydraulic brake lines of the vehicle and braking is provided by a brake pedal of the vehicle.

13. The kit of claim 12 wherein during remote operation of the vehicle, the steering servo is decoupled from the steering wheel and a control system provides control signals to proportionally control the steering servo, the hydraulic brake servo, and the throttle control servo, and provides a gear-selection control signal to the gear-selection linear actuator.

14. A remote-control conversion pedestal to mount in place of a driver's seat in an automotive vehicle to allow remote operation of the vehicle, the pedestal comprising:
a vertically-extendable stand;
a tiltable plate mounted on the vertically-extendable stand;
a bottom plate coupled to the vertically-extendable stand, the bottom plate adapted to bolt to a floor of the vehicle in place of the driver's seat;
a seat socket to accept a seat, the seat to support a human for human operation of the vehicle while the pedestal remains mounted to the floor;
a platform to support a seat, the platform supported by a vertical stand which is coupled to the bottom plate; and
a side plate to couple the vertical stand with the vertically-extendable stand,
wherein the pedestal is configured to remain in place during human operation of the vehicle, wherein the tiltable plate allows the steering servo to be decoupled from the steering wheel to allow human operation of the vehicle.

15. The pedestal of claim 14 wherein the tiltable plate is configured to accept a steering servo mounted thereon for coupling to a steering wheel of the vehicle,
wherein the side plate is configured to accept a throttle control servo mounted thereon to couple with a throttle body of the vehicle using an additional throttle cable,
wherein the side plate is further configured to accept a gear-selection linear actuator mounted thereon to couple with a gear selection mechanism of an automatic transmission of the vehicle using a flexible push-pull cable, and
wherein the bottom plate is configured to accept an electrically operated hydraulic brake servo mounted thereon to couple with hydraulic brake lines of the vehicle.

16. The pedestal of claim 15 wherein during human operation of the vehicle:
the steering servo is decoupled from the steering wheel,
the seat is mounted to the platform to support a human while the bottom plate remains mounted to the vehicle floor,
the throttle control servo remains coupled with the throttle body of the vehicle and throttle control is provided by an accelerator of the vehicle,
the gear-selection linear actuator remains coupled with a gear selection mechanism of the transmission and gear selection is provided by an electric gear-selection switch coupled to the gear-selection linear actuator, and
the hydraulic brake servo remains coupled with the hydraulic brake lines of the vehicle and braking is provided by a brake pedal of the vehicle.

17. The pedestal of claim 16 wherein during remote operation of the vehicle, the steering servo is decoupled from the steering wheel and a control system provides control signals to proportionally control the steering servo, the hydraulic brake servo, and the throttle control servo, and provides a gear-selection control signal to the gear-selection linear actuator.

18. A system for remote operation of an automotive vehicle comprising:
a remote-control conversion pedestal to mount in place of a driver's seat in the vehicle; and
a control system,
wherein the pedestal comprises servos for steering control, throttle control, braking control, and gear selection mounted thereon and is configured to allow the steering servo to be decoupled from a steering wheel to allow human operation of the vehicle while the pedestal remains in place,
wherein the pedestal is configured to allow a human to sit thereon to allow human operation of the vehicle while the pedestal remains in place, a seat socket to accept a seat, the seat to support a human for human operation of the vehicle while the pedestal remains mounted to the floor; and wherein the control system is configured to provide control signals for the servos during remote operation of the vehicle.

19. The system of claim 18 further comprising a video transmission system to transmit a live video of frontal field-of-view of the vehicle and a dash view of the vehicle.

20. The system of claim 19 wherein the pedestal comprises:

a vertically-extendable stand;

a tiltable plate mounted on the vertically-extendable stand;

a bottom plate coupled to the vertically-extendable stand, the bottom plate adapted to bolt to a floor of the vehicle in place of the driver's seat;

a platform to support a seat, the platform supported by a vertical stand which is coupled to the bottom plate; and a side plate to couple the vertical stand with the vertically-extendable stand, wherein the tiltable plate is configured to accept the steering servo mounted thereon for coupling to the steering wheel of the vehicle, wherein the side plate is configured to accept the throttle control servo mounted thereon to couple with a throttle body of the vehicle using an additional throttle cable, wherein the side plate is further configured to accept a gear-selection linear actuator mounted thereon to couple with a gear selection mechanism of an automatic transmission of the vehicle using a flexible push-pull cable, and wherein the bottom plate is configured to accept the braking control servo mounted thereon to couple with hydraulic brake lines of the vehicle.

* * * * *